(12) United States Patent
Cho (10) Patent No.: US 11,879,846 B2
(45) Date of Patent: Jan. 23, 2024

(54) RAMAN SPECTROSCOPY METHOD AND APPARATUS USING BROADBAND EXCITATION LIGHT

(71) Applicant: Answeray Inc., Gwacheon-si (KR)

(72) Inventor: Seong Ho Cho, Gwacheon-si (KR)

(73) Assignee: ANSWERAY INC., Gwacheon-si (KR)

( * ) Notice: Subject to any disclaimer, the term of this patent is extended or adjusted under 35 U.S.C. 154(b) by 747 days.

(21) Appl. No.: 16/968,754

(22) PCT Filed: Feb. 8, 2019

(86) PCT No.: PCT/KR2019/001562
§ 371 (c)(1),
(2) Date: Aug. 10, 2020

(87) PCT Pub. No.: WO2019/156497
PCT Pub. Date: Aug. 15, 2019

(65) Prior Publication Data
US 2020/0408692 A1 Dec. 31, 2020

(30) Foreign Application Priority Data

Feb. 8, 2018 (KR) .......................... 10-2018-0015756

(51) Int. Cl.
*G01N 21/65* (2006.01)

(52) U.S. Cl.
CPC ..... *G01N 21/65* (2013.01); *G01N 2201/0631* (2013.01); *G01N 2201/0633* (2013.01); *G01N 2201/0636* (2013.01); *G01N 2201/0638* (2013.01)

(58) Field of Classification Search
None
See application file for complete search history.

(56) References Cited

U.S. PATENT DOCUMENTS

| 5,450,193 A | * | 9/1995 | Carlsen | G01J 3/44 |
| | | | | 356/246 |
| 5,455,673 A | * | 10/1995 | Alsmeyer | G01J 3/44 |
| | | | | 356/301 |
| 5,572,125 A | * | 11/1996 | Dunkel | G01R 33/483 |
| | | | | 324/309 |

(Continued)

FOREIGN PATENT DOCUMENTS

| KR | 10-2008-0064138 A | 7/2008 |
| KR | 10-2013-0113136 A | 10/2013 |
| KR | 10-2013-0135730 A | 12/2013 |

OTHER PUBLICATIONS

International Search Report for PCT/KR2019/001562 dated May 27, 2019 from Korean Intellectual Property Office.

*Primary Examiner* — Lina Cordero
(74) *Attorney, Agent, or Firm* — Paratus Law Group, PLLC (57) ABSTRACT

Disclosed is a method of processing a Raman spectroscopy signal. The method includes: obtaining a first resolution of Raman spectroscopy by irradiating a target sample with broadband excitation light; calculating a Raman spectroscopy signal corresponding to the Raman spectroscopy of the first resolution; and calculating a signal corresponding to a second resolution of Raman spectroscopy that is higher than the first resolution by deconvoluting a Raman light signal.

13 Claims, 6 Drawing Sheets

(56) References Cited

U.S. PATENT DOCUMENTS

| | | | |
|---|---|---|---|
| 5,697,373 A * | 12/1997 | Richards-Kortum | A61B 5/0075 |
| | | | 600/475 |
| 5,994,690 A | 11/1999 | Kulkarni et al. | |
| 6,710,869 B1 * | 3/2004 | De Weijer | G01N 21/65 |
| | | | 264/408 |
| 7,327,453 B2 * | 2/2008 | Coppeta | G01J 3/04 |
| | | | 356/301 |
| 2006/0027754 A1 | 2/2006 | Ramsden et al. | |
| 2006/0176478 A1 * | 8/2006 | Clarke | G01J 3/02 |
| | | | 356/301 |
| 2007/0078349 A1 * | 4/2007 | Ferguson | A61B 5/0059 |
| | | | 600/407 |
| 2007/0146699 A1 * | 6/2007 | Wang | G01J 3/10 |
| | | | 356/301 |

\* cited by examiner

RAMAN SPECTROSCOPY METHOD AND APPARATUS USING BROADBAND EXCITATION LIGHT

TECHNICAL FIELD

The present invention relates to a Raman spectroscopy method and an apparatus therefor using a broadband excitation light.

BACKGROUND ART

Raman scattering is a phenomenon in which, when a material is irradiated with excitation light having a fixed frequency, scattered light having a wavelength, that is, a frequency, varies due to interaction with a medium. Raman spectroscopy is a method of measuring vibration spectroscopy of a molecule generated from Raman scattering, determining a vibration structure of the molecule, and qualitatively and quantitatively analyzing a material on the basis of the vibration the molecule.

In Raman spectroscopy, a spectrum peak including unique information related to a vibration of a molecule is present, and thus it is possible to analyze molecules contained in a material using the spectrum peak like a fingerprint print. Thus, the Raman spectroscopy has accuracy that is relatively higher than accuracy of a general spectroscopic technique based on absorption or Rayleigh scattering.

The spectrum peak occurs when light incident on a material is scattered while absorbing or emitting as much light energy as natural vibration energy of molecules of the material. The spectrum peak is due to a Raman shift which is an energy difference between the incidence and the scattering of the light. A Raman spectrum peak measured in a wavelength domain has a small width in the wavelength domain, and discriminative power of a molecule is increased at a high resolution and a high signal-to-noise ratio. To this end, a laser is generally used because light having a narrow bandwidth and high power is required for excitation light.

DISCLOSURE

Technical Problem

In order to obtain high-resolution Raman spectroscopy, broadband excitation light cannot be used. In order to obtain a stable narrow bandwidth, a narrow band laser or a single frequency laser is generally used. Since a driving device, and a cooling device for controlling a wavelength shift due to a variation in temperature are required, there are disadvantages of being complicated and expensive.

The present invention is directed to providing a method and an apparatus which allows high-resolution Raman spectroscopy to be achieved with a simplified light source and a low cost as compared with the related art.

Technical Solution

One aspect of the present invention provides a Raman spectrometer which analyzes Raman light obtained by irradiating a target sample with broadband excitation light, the Raman spectrometer including an arithmetic and logic unit configured to perform a deconvolution operation on a signal which detects Raman scattering having a first resolution and form a Raman light signal having a second resolution that is higher than the first resolution.

Another aspect of the present invention provides a method of processing a Raman spectroscopy signal, the method including irradiating a target sample with broadband excitation light and obtaining Raman scattering having a first resolution, calculating a Raman spectroscopy signal corresponding to the Raman scattering having the first resolution, and deconvoluting a Raman light signal and calculating a signal corresponding to Raman scattering having a second resolution that is higher than the first resolution.

Advantageous Effects

In accordance with the present embodiment, there is provided an advantage in that a Raman light signal having a high resolution can be obtained without using an expensive and complicated narrow band light source.

MODES OF THE INVENTION

Since the description of the present invention is merely embodiments for structural or functional description, the scope of the present invention should not be interpreted as being limited by the embodiments described herein. That is, since the embodiments can be variously altered and have various forms, it should be understood that the scope of the present invention includes equivalents capable of implementing technical ideas.

Meanwhile, the meaning of terms used herein should be understood as follows:

It should be understood that the singular forms include plural forms unless the context clearly notes otherwise, and terms such as "comprising," "having," and the like are used to specify that a feature, a number, a step, an operation, a component, a part, or a combination thereof described herein is present, and they do not preclude the presence or addition of one or more other features, numbers, steps, operations, components, parts, or combinations thereof.

Each step may be performed differently from the order specified unless a specific order is explicitly stated in the context. That is, each step may be performed in the same order as specified, may be substantially performed simultaneously, or may be performed in the reverse order.

The accompanying drawings referenced to describe the embodiments of the present invention are intentionally exaggerated in size, height, thickness, and the like for convenience of description and for ease of understanding and are not enlarged or reduced in proportion. In addition, certain components illustrated in the drawings may be intentionally reduced and expressed, and other components illustrated therein may be intentionally enlarged and expressed.

Unless otherwise defined, all terms used herein have the same meanings as commonly understood by those skilled in the art to which the invention pertains. General terms that are defined in a dictionary should be construed to have meanings that are consistent in the context of the relevant art and should not be interpreted as having an idealistic or excessively formalistic meaning unless clearly defined in this disclosure.

Hereinafter, a Raman spectrometer and a Raman spectroscopy signal forming method according to the present embodiment will be described with reference to the accompanying drawings. FIGS. 1A to 1D are schematic diagrams for describing a configuration of a Raman spectrometer according to the present embodiment. A Raman spectrometer according to each embodiment illustrated in FIGS. 1A to 1D includes a light source 100 which provides broadband excitation light, a dichroic mirror 300 which provides the broadband excitation light to a target sample and allows Raman light to pass therethrough, and a spectroscopic part 500 for spectralizing the Raman light.

As one embodiment, the spectroscopic part 500 includes a diffraction grating 510 for spectralizing the Raman light and a detector 520 for detecting the Raman light which is spectralized by the diffraction grating and outputting an electrical signal corresponding to the detected Raman light.

Figure 1A:
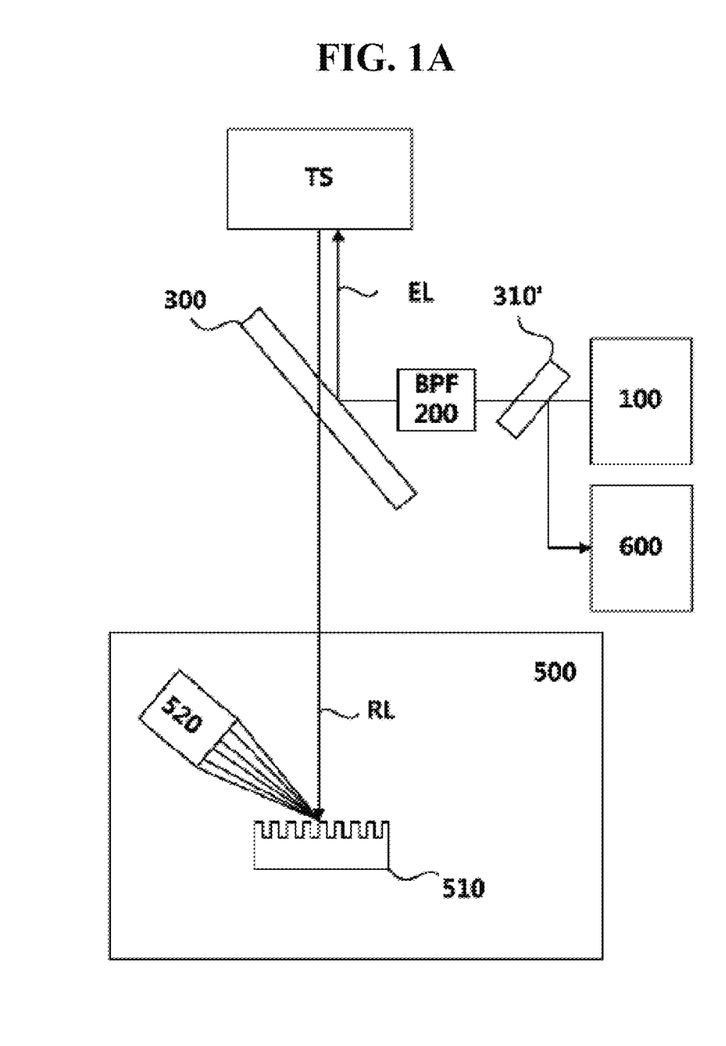
FIGS. 1A to 1D are schematic diagrams for describing a configuration of a Raman spectrometer according to the present embodiment.
Figure 1B:
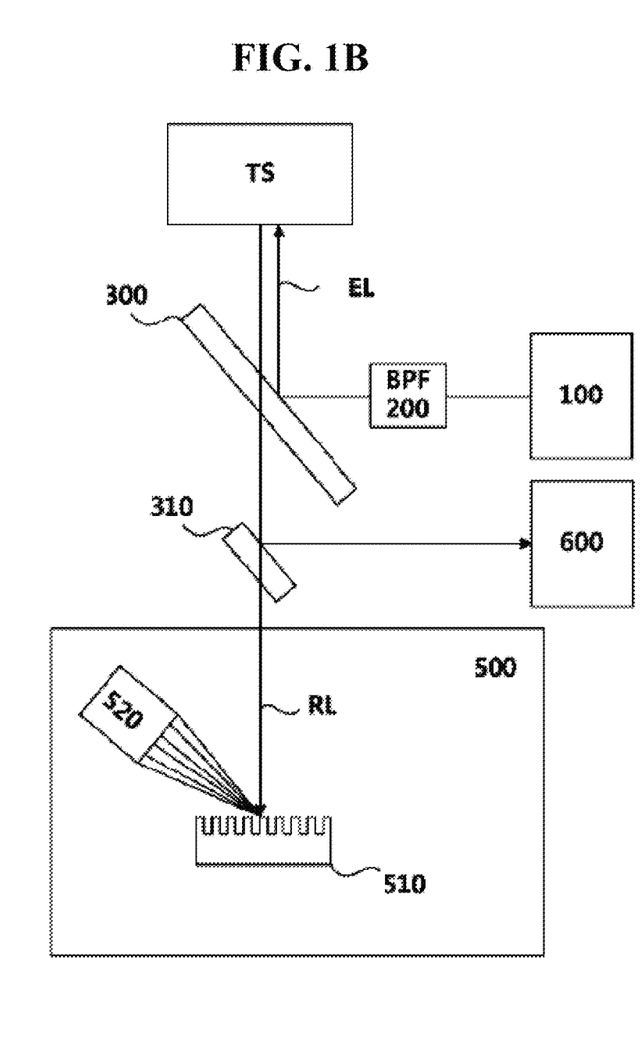
Figure 1C:
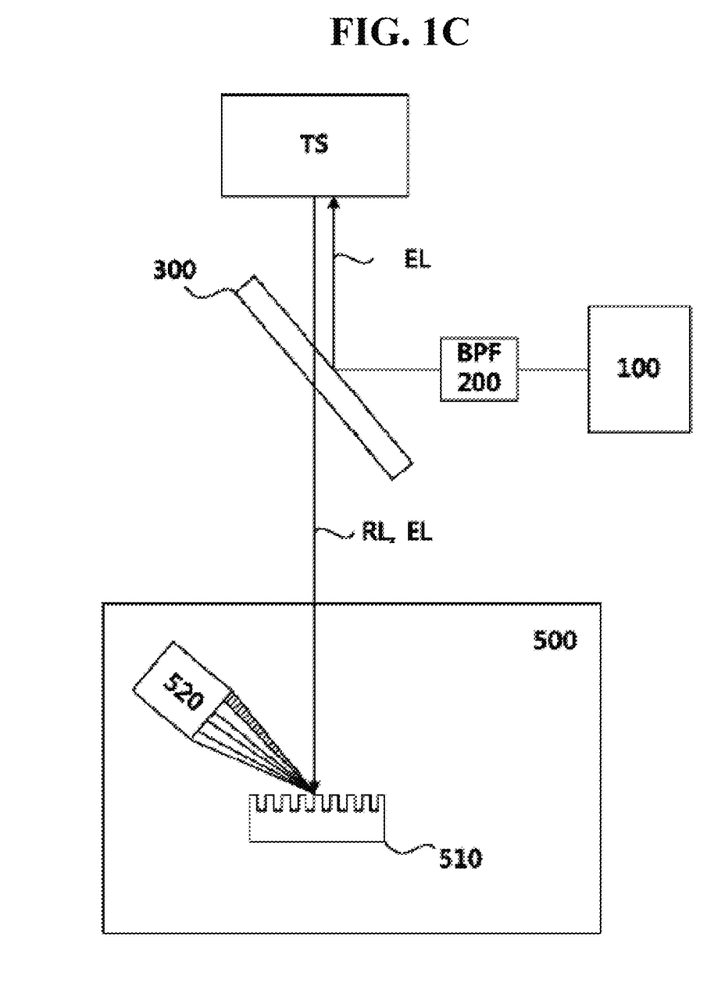
Figure 1D:
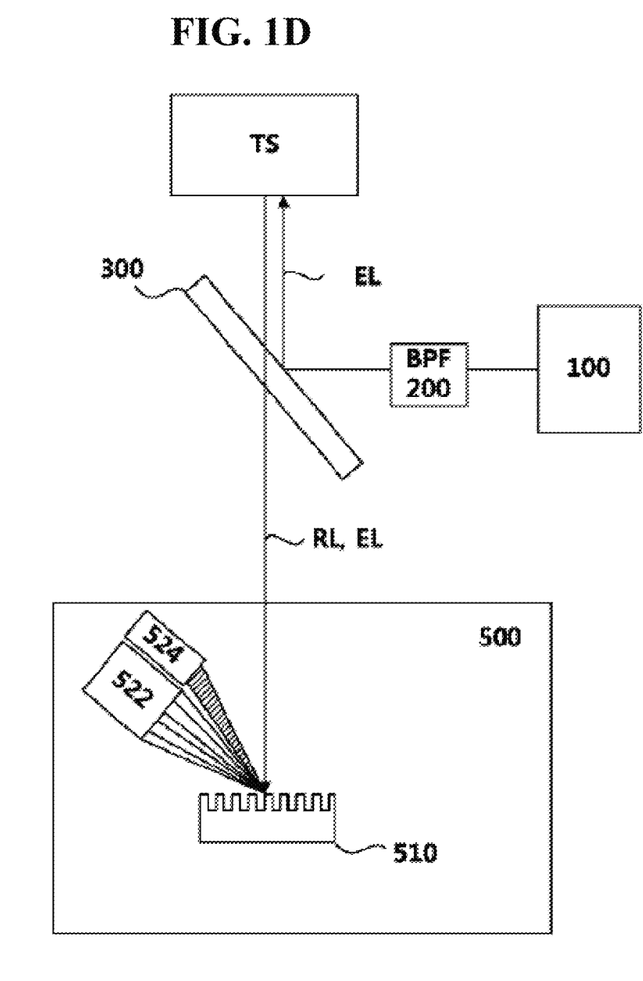
Figure 2A:
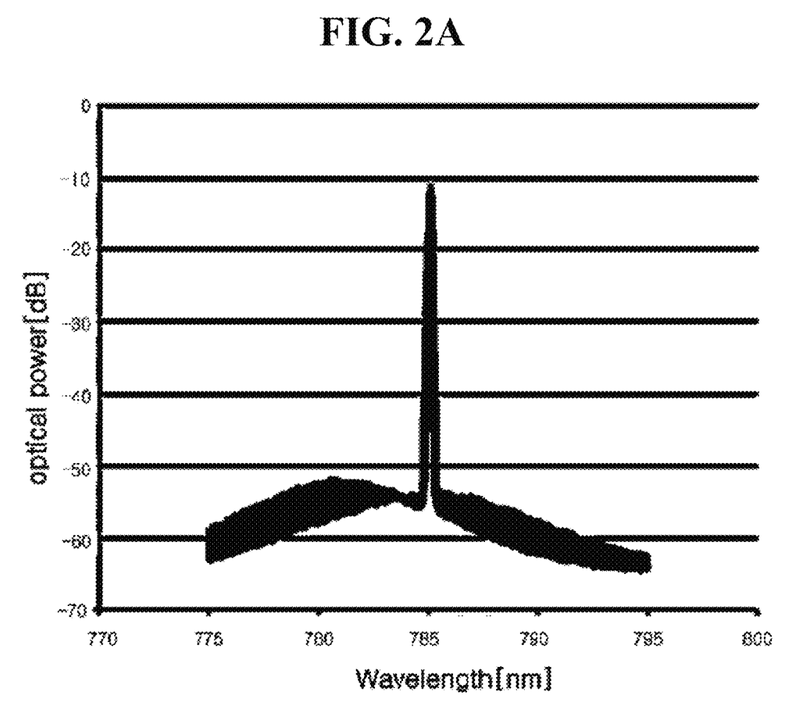
FIG. 2A is a diagram illustrating a spectrum of a narrow-band light source used in Raman spectroscopy according to the related art.
Figure 2B:
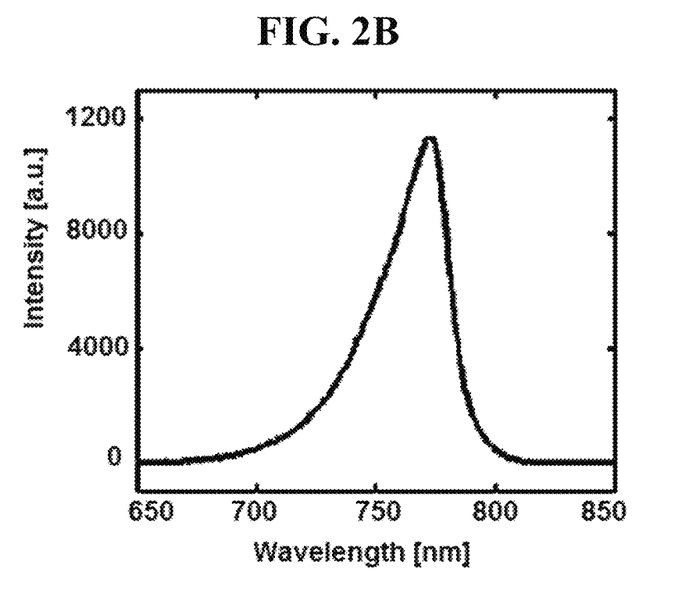
FIG. 2B is a diagram illustrating an intensity according to a wavelength of light which is output from a broadband light source.
Figure 2C:
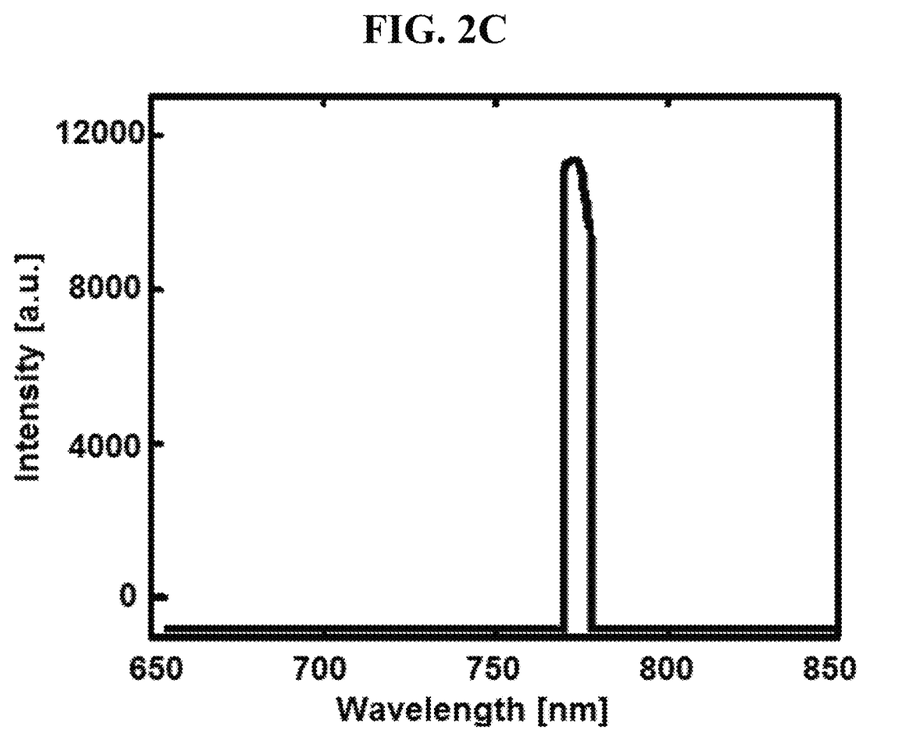
FIG. 2C is a diagram illustrating an intensity according to a wavelength of light which is output through a band pass filter.

FIG. 2A illustrates a spectrum of a narrowband light source used in Raman spectroscopy according to the related art, FIG. 2B illustrates an intensity according to a wavelength of light which is output from a broadband light source, and FIG. 2C illustrates an intensity according to a wavelength of light which is output through a band pass filter. Referring to FIGS. 1 and 2, the light source 100 outputs light having a broadband bandwidth of tens to hundreds of nanometers (nm) as shown in FIG. 2B. As one embodiment, the light source may be any one among thermal radiation, a light emitting diode (LED), and a pulsed laser. For example, the pulsed laser may be any one among a mode-locking pulsed laser, a Q-switching laser, and a gain switching laser.

In the embodiment illustrated in FIG. 1, a band pass filter 200 receives light output from the light source 100, converts the received light to have a bandwidth of about 10 nm as shown in FIG. 2C, and provides the converted light to a target sample TS. In an embodiment not shown in the drawings, the light output from the light source 100 may be provided to the target sample TS without passing through the band pass filter.

A bandwidth of a narrowband spectrum used in the Raman spectroscopy according to the related art shown in FIG. 2A is less than or equal to approximately nm. Thus, as shown in FIG. 2C, even when the light has a bandwidth of several nm by passing through the band pass filter 200, the light has a relatively wide bandwidth.

The light output from the light source 100 is provided to the target sample TS through the dichroic mirror 300. The dichroic mirror 300 is a mirror having a characteristic of reflecting light having a first wavelength and allowing light having a second wavelength to pass therethrough. The dichroic mirror 300 according to the present embodiment reflects the light output from the light source 100 or from the light passing through the band pass filter 200. The light is reflected from the dichroic mirror 300 and then provided to the target sample TS so that Raman light RL of which a wavelength and a frequency are varied due to interaction with a material of the target sample TS is output.

In one embodiment, the Raman spectrometer may further include a long pass filter (LPF) which removes a short wavelength component of excitation light EL from Raman light RL.

The light output from the target sample TS includes the excitation light EL and the Raman light RL.

As in the embodiment illustrated in FIG. 1A, a component of the excitation light of the light output from the light source may be reflected by a second dichroic mirror 310' to be provided to a second spectrometer. Alternatively, as in the embodiment illustrated in FIG. 1B, a component of the excitation light EL of the light output from the target sample TS may be reflected by a second dichroic mirror 310 to be provided to a second spectrometer 600. The second spectrometer 600 may detect a spectral shape of the excitation light provided to the target sample TS from the provided light.

A component of the Raman light RL passing through the second dichroic mirror 310 is supplied to the spectroscopic part 500 and spectralized, a spectral component of the Raman light RL is detected, and an electrical signal corresponding to the spectral component is output. According to an embodiment, the spectroscopic part 500 includes a spectrometer including at least one diffraction grating 510, a slit (not shown) for adjusting a spectral resolution, a light collecting system (not shown) including a lens and a mirror which collect light, and a detector 520 which outputs an electrical signal corresponding to the provided light.

An arithmetic and logic unit (not shown) receives electrical signals output from the detector 520 and the second spectrometer 600, and performs an algorithm which will be described below.

In the embodiment illustrated in FIG. 1C, the component of the Raman light RL and the component of the excitation light EL (shown as a slash) which is transmitted through the dichroic mirror 300 may be provided to the spectroscopic part 500 and analyzed therein. A filter capable of selectively filtering only an intensity of the component of the excitation light (shown as the slash) may be employed. The spectroscopic part 500 detects the component of the Raman light RL and the component of the excitation light EL (shown as the slash in FIG. 1C) and outputs electrical signals corresponding to the detected components.

As in the embodiment illustrated in FIG. 1D, the spectroscopic part 500 may include a first detector 522 for detecting the component of the Raman light RL to output an electrical signal corresponding to the detected component and a second detector 524 for detecting the component of the excitation light EL (shown as a slash) to output an electrical signal corresponding to the detected component. For example, since the intensity of the component of the excitation light EL is greater than the intensity of the component of the Raman light RL, an attenuation filter AF or a neutral density filter (NDF), which attenuates the intensity of the component of the excitation light EL, may be disposed in front of the second detector 524 to control an intensity of light.

In an embodiment which is not illustrated, a long pass filter for selectively allowing the component of the Raman light RL to transmit therethrough may be further included in front of the spectroscopic part 500.

The arithmetic and logic unit (not shown) receives a Raman light signal having a first resolution corresponding to the detected Raman light and performs an arithmetic and logic operation of an algorithm to form a Raman light signal having a second resolution that is higher than the first resolution. For example, the arithmetic and logic unit may be integrally formed with the light source 100, the band pass filter 200, the dichroic mirror 300, and the spectroscopic part 500. Alternatively, the arithmetic and logic unit may be formed separately from the light source 100, the band pass filter 200, the dichroic mirror 300, and the spectroscopic part 500 and may perform an algorithm, which will be described below, in a computing device such as a smart terminal, a laptop, a desktop, and a workstation, or the like.

Figure 3:
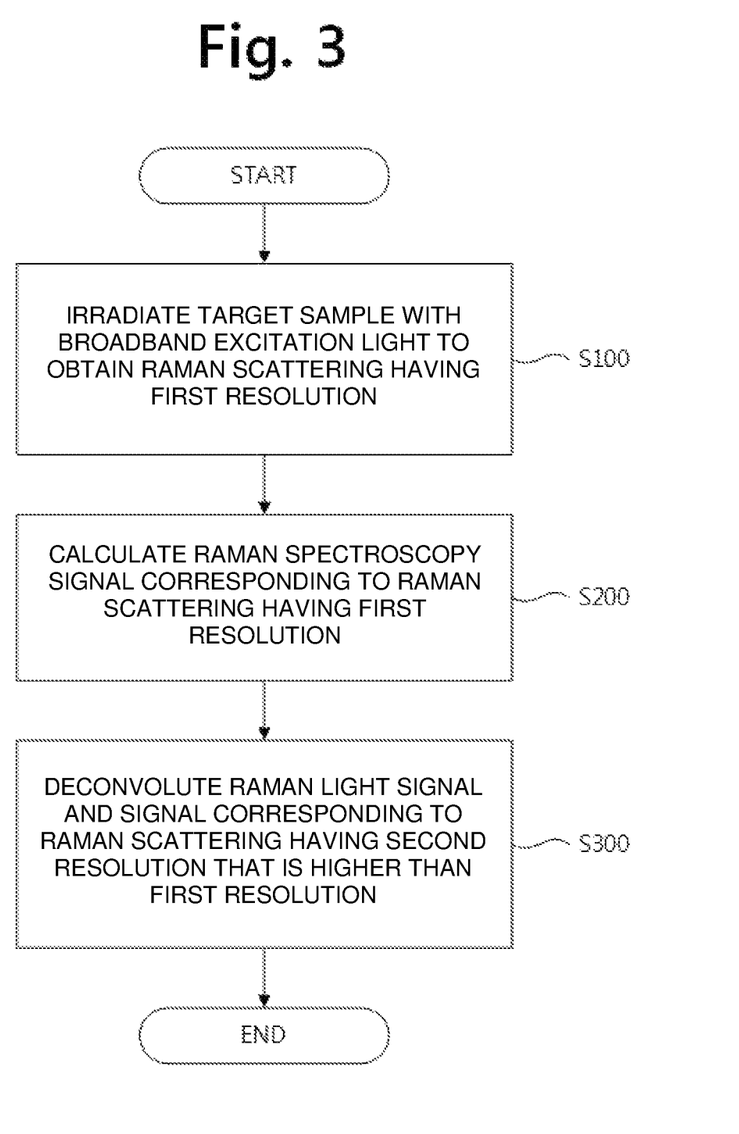
FIG. 3 is a flowchart illustrating a method of processing a Raman spectroscopy signal according to the present embodiment.

Hereinafter, a method of forming a Raman spectroscopy signal according to the present embodiment will be described with reference to the accompanying drawings. FIG. 3 is a flowchart illustrating a method of processing a Raman spectroscopy signal according to the present embodiment. Referring to FIG. 3, the method of processing a Raman spectroscopy signal according to the present embodiment includes irradiating a target sample with broadband excitation light to obtain Raman light having a first resolution (S100), and the detector 520 detects the Raman light and outputs a Raman light signal corresponding to the Raman light having the first resolution.

The Raman light signal corresponding to the Raman light having the first resolution is formed such that the broadband excitation light is convoluted with a Raman transfer function of the target sample. Thus, the Raman light signal has a low resolution. The arithmetic and logic unit 300 performs a deconvolution operation on the Raman light signal to calculate a signal corresponding to Raman scattering having a second resolution that is higher than the first resolution (S300).

Mathematical expressions with respect to the excitation light EL and the Raman light RL are summarized as follows. The excitation light is divided into a general narrow band excitation light $f(\lambda)$ and a broadband excitation light $g(\lambda)$ in a wavelength domain, and Raman lights due to the excitation light are referred to as $R(\lambda)$ and $S(\lambda)$.

The Raman light generated due to the narrow band excitation light $f(\lambda)$ and the Raman light generated due to the broadband excitation light $g(\lambda)$ may be expressed as the following equation by the Raman transfer function.

$R(\lambda)$=Raman Transfer Function$[f(\lambda)]=TS*f(\lambda)S(\lambda)$
   =Raman Transfer Function$[g(\lambda)]=TS*g(\lambda)$   [Equation 1]

(*: a convolution operation, and TS: a Raman transfer function of a target sample)

The Raman transfer function which generates Raman light is an intrinsic characteristic which is varied according to a molecule of a material. When a spectrum of the broadband excitation light is divided into m spectra of a narrow band light source, a relational expression between the m spectra is expressed by the following equation.

$$g(\lambda) = \sum_{n=1, n,m \in N}^{m} f(\lambda)\delta(\lambda - \lambda_n) \quad \text{[Equation 2]}$$

That is, the broadband excitation light $g(\lambda)$ may be decomposed into m narrow band components by a delta function. The delta function is defined as the following equation.

$$\delta(x) = \begin{cases} \infty, & x = 0 \\ 0, & x \neq 0 \end{cases} \quad \text{[Equation 3]}$$

$$\int_{-\infty}^{\infty} \delta(x)dx = 1$$

$f(\lambda)$ may be any one among various basis functions or a function in which the various basis functions are linearly or nonlinearly combined. For example, the basis function may include any one among the following functions.

Lorentzian function: $f(\lambda) = f_o \dfrac{1}{\pi} \dfrac{\dfrac{\Delta\lambda}{2}}{(\lambda - \lambda_c)^2 + \left(\dfrac{\Delta\lambda}{2}\right)^2}$.

Gaussian function: $f(\lambda) = f_o \dfrac{1}{\Delta\lambda\sqrt{2\pi}} e^{-\frac{1}{2}\left(\frac{\lambda-\lambda_c}{\Delta\lambda}\right)^2}$.

Rectangular function: $f(\lambda) = \lim_{n\to\infty, n\in Z} f_o \dfrac{1}{\left(\dfrac{2\lambda}{\Delta\lambda}\right)^{2n} + 1}$.

An amplitude $f_o$ of each of the Lorentzian function, the Gaussian function, and the Rectangular function may be varied according to a wavelength and may have a maximum value $f_{o,max}$ and/or a minimum value $f_{o,min}$ at a specific wavelength. A mathematical expression of the Raman light RL, which is formed due to the provision of the excitation light, is expressed as Equation 4 below.

$$S(\lambda) = \text{Raman Tranfer Function}\left[\sum_{n=1, n,m \in (N)}^{m} f(\lambda)\delta(\lambda - \lambda_n)\right] \quad \text{[Equation 4]}$$

$$= \sum_{n=1, n,m \in (N)}^{m} [TS * f(\lambda)]\delta(\lambda - \lambda_n)$$

$$= \sum_{n=1, n,m \in (N)}^{m} R(\lambda)\delta(\lambda - \lambda_n)$$

Equation 4 may represent the broadband Raman scattering $S(\lambda)$ as the sum of Raman scatterings $R(\lambda_1)$, $R(\lambda_2)$, $R(\lambda_3)$, ..., $R(\lambda_n)$ due to the narrow band excitation light.

When Raman scattering is not significantly affected by a wavelength of excitation light, Raman scattering $R(\lambda_k)$ with respect to excitation light f(k k) having any specific wavelength may be applied to all n values. Alternatively, when excitation lights $f(\lambda_1)$, $f(\lambda_2)$, $f(\lambda_n)$ with respect to wavelengths $\lambda_m$ are known, previously measured values may be used as the narrow band Raman spectroscopies $R(\lambda_1)$, $R(\lambda_2)$, $R(\lambda_3)$, ..., $R(\lambda_n)$. In this case, an amplitude of Raman light with respect to each wavelength is determined by an intensity of excitation light intensity at each wavelength.

A deconvolution operation may be performed on the measured Raman light $S(\lambda)$ to obtain a desired $R(\lambda)$. The Raman light $S(\lambda)$ and the Raman scattering $R(\lambda)$ may be expressed as Equation 1, and, when $R(\lambda)$ deconvoluted by omitting TS is expressed as $S(\lambda)$, Equation 5 below is obtained.

$$R = f * g^{-1} * S \quad \text{[Equation 5]}$$

$$= \sum_{\lambda_m = -M}^{M} \sum_{\lambda_n = -N}^{N} f(\lambda_m) g^{-1}(\lambda_n - \lambda_m) S(\lambda - \lambda_n),$$

-continued where $\lambda_m, \lambda_n, M, n \in Z$

The arithmetic and logic unit may numerically analytically calculate Equation to obtain desired narrow band Raman scattering $R(\lambda)$.

Figure 4A:
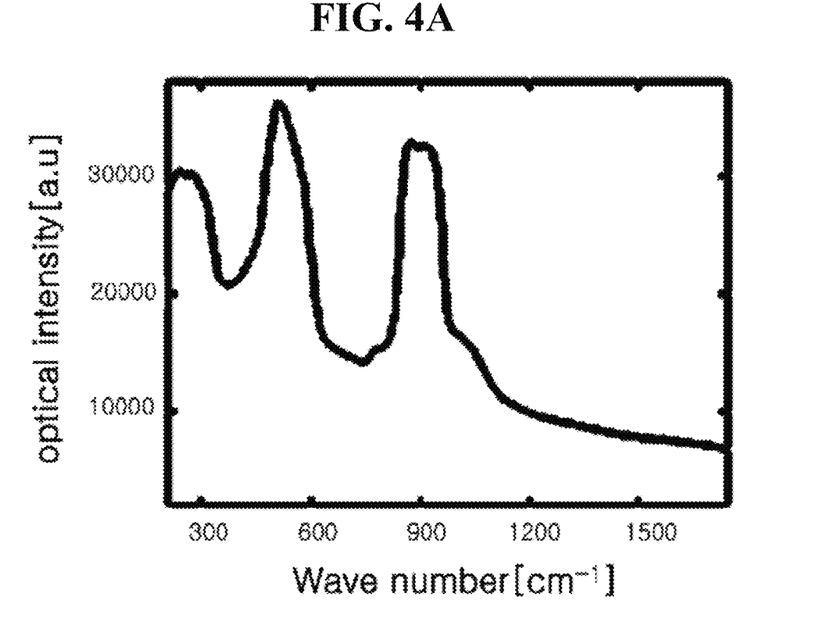
FIG. 4A is a diagram illustrating an overview of a Raman light signal having a second resolution.
Figure 4B:
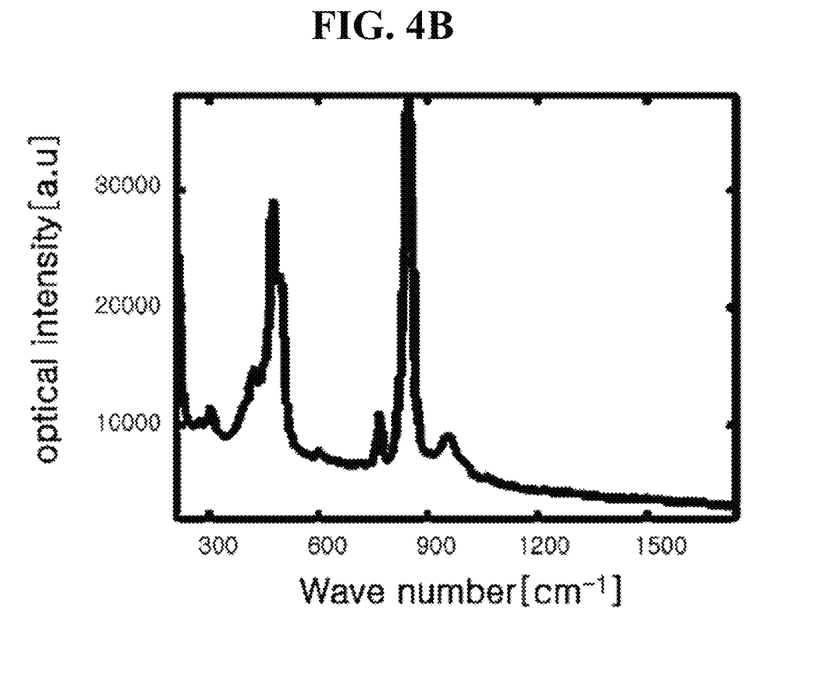
FIG. 4B is a diagram illustrating a Raman light signal corresponding to Raman light having a first resolution.

FIG. 4B is a diagram illustrating a Raman light signal corresponding to Raman light having a first resolution which is output from the detector 520. As described above, since the Raman light signal having the first resolution is formed by convolution with the broadband excitation light, the Raman light signal has a low resolution. However, when Equation 5 is calculated, a Raman light signal having a high resolution may be obtained as shown in FIG. 4A.

In order to aid in understanding of the present invention, the description has been made with reference to the embodiments shown in the drawings, but these embodiments are for implementation and are merely illustrative. Thus, those skilled in the art will appreciate that various modifications and other equivalent embodiments can be derived without departing from the scope of the present invention. Therefore, the true technical scope of the present invention should be defined by the appended claims.

The invention claimed is:

1. A Raman spectrometer which analyzes Raman light obtained by irradiating a target sample with broadband excitation light, the Raman spectrometer comprising:
   an arithmetic and logic unit configured to
      perform a deconvolution operation on a signal which detects Raman scattering having a first resolution, and
      form a Raman light signal having a second resolution that is higher than the first resolution,
   wherein forming the Raman light signal having the second resolution is performed by convoluting inverse functions of narrowband excitation light and broadband excitation light with the Raman light signal having the first resolution, and
   wherein the arithmetic and logic unit is implemented via at least one processor.

2. The Raman spectrometer of claim 1,
   wherein the arithmetic and logic unit performs the deconvolution operation on the signal, in which signals corresponding to Raman lights obtained by irradiating the target sample with the narrowband excitation light are superimposed, and forms the Raman light signal having the second resolution.

3. The Raman spectrometer of claim 2,
   wherein the signals corresponding to the Raman lights obtained by irradiating the target sample with the narrowband excitation light are measured in advance and stored.

4. The Raman spectrometer of claim 1,
   wherein the broadband excitation light is expressed by a function in which a plurality of basis functions are combined.

5. The Raman spectrometer of claim 1,
   wherein the arithmetic and logic unit solves an equation $$R = f * g^{-1} * S$$
$$= \sum_{\lambda_m=-M}^{M} \sum_{\lambda_n=-N}^{N} f(\lambda_m) g^{-1}(\lambda_n - \lambda_m) S(\lambda - \lambda_n),$$

-continued where $\lambda_m, \lambda_n, M, n \in Z$ to form a Raman spectroscopy signal having the second resolution, wherein $S(\lambda)$ is the signal which detects the Raman scattering having the first resolution, $R(\lambda)$ is the Raman light signal having the second resolution, $f(\lambda)$ is the narrowband excitation light, $g(\lambda)$ is the broadband excitation light, $\lambda_m$ is a wavelength of the narrowband excitation light $f(\lambda)$, $\lambda_n$ is a wavelength of an inverse function of the broadband excitation light $g^{-1}(\lambda-\lambda_m)$, M is a number of the wavelength $\lambda_m$, N is a number of the wavelength $\lambda_n$, and Z is any integer number.

6. The Raman spectrometer of claim 1,
   wherein the Raman spectrometer includes:
      a light source which provides the broadband excitation light;
      a semi-transparent mirror which provides the broadband excitation light to the target sample and transmits the Raman light; and
      a spectroscopic part configured to spectralize the Raman light.

7. The Raman spectrometer of claim 6,
   wherein the light source includes thermal radiation, a light emitting diode (LED), or a pulsed laser.

8. The Raman spectrometer of claim 6,
   wherein the spectroscopic part includes:
      at least one diffraction grating configured to spectralize the Raman light;
      a slit configured to adjust a spectral resolution;
      a lens and a mirror which collect light output from the at least one diffraction grating; and
      a detector configured to detect light output from the lens.

9. The Raman spectrometer of claim 8,
   wherein the detector further detects the broadband excitation light from the Raman light which is spectralized by the at least one diffraction grating.

10. The Raman spectrometer of claim 6,
    wherein:
       the light source includes one or more among thermal radiation, a light emitting diode (LED), and a pulsed laser; and
       the Raman spectrometer further includes a band pass filter configured to allow only a desired band of light, which is provided from the light source, to pass therethrough.

11. The Raman spectrometer of claim 1, further comprising:
    a spectrometer configured to detect a spectrum of the broadband excitation light from the Raman light; and
    a long pass filter configured to selectively allow only the Raman light to pass therethrough.

12. A method of forming a Raman spectroscopy signal, the method comprising:
    irradiating a target sample with broadband excitation light and obtaining Raman scattering having a first resolution;
    calculating the Raman spectroscopy signal corresponding to the Raman scattering having the first resolution; and
    deconvoluting a Raman light signal and calculating a signal corresponding to the Raman scattering having a second resolution that is higher than the first resolution,
    wherein calculating the Raman spectroscopy signal corresponding to the Raman scattering having the second resolution is performed by convoluting inverse functions of narrowband excitation light and the broadband excitation light with the Raman light signal having the first resolution.

13. The method of claim 12,
wherein calculating the signal corresponding to the Raman scattering having the second resolution is performed by calculating an equation $$R = f * g^{-1} * S$$
$$= \sum_{\lambda_m=-M}^{M} \sum_{\lambda_n=-N}^{N} f(\lambda_m) g^{-1}(\lambda_n - \lambda_m) S(\lambda - \lambda_n),$$

where $\lambda_m, \lambda_n, M, n \in Z$, wherein $S(\lambda)$ is a signal which detects the Raman scattering having the first resolution, $R(\lambda)$ is the Raman light signal having the second resolution, $f(\lambda)$ is the narrowband excitation light, $g(\lambda)$ is the broadband excitation light, $\lambda_m$ is a wavelength of the narrowband excitation light $f(\lambda)$, $\lambda_n$ is a wavelength of an inverse function of the broadband excitation light $g^{-1}(\lambda - \lambda_m)$, M is a number of the wavelength $\lambda_m$, N is a number of the wavelength $\lambda_n$, and Z is any integer number.

* * * * *